US012679944B2

(12) United States Patent
Chou et al.

(10) Patent No.: US 12,679,944 B2
(45) Date of Patent: Jul. 14, 2026

(54) CROSSLINKABLE AND FOAMABLE COMPOSITION, FOAM OBTAINED BY THE SAME, COMPOSITION FOR FOAMING AND USE THEREOF

(71) Applicant: LCY CHEMICAL CORP., Kaohsiung City (TW)

(72) Inventors: Richard Tien-Hua Chou, Hockessin, DE (US); Yu-Yan Li, Kaohsiung City (TW); Wei-Chin Huang, Kaohsiung City (TW); You-Min Wang, Kaohsiung City (TW); Jing-Chung Kuo, Kaohsiung City (TW)

(73) Assignee: LCY CHEMICAL CORP., Kaohsiung City (TW)

( * ) Notice: Subject to any disclaimer, the term of this patent is extended or adjusted under 35 U.S.C. 154(b) by 952 days.

(21) Appl. No.: 17/826,661

(22) Filed: May 27, 2022

(65) Prior Publication Data

US 2022/0380566 A1 Dec. 1, 2022

Related U.S. Application Data

(60) Provisional application No. 63/194,198, filed on May 28, 2021.

(51) Int. Cl.
C08L 53/02 (2006.01)
C08F 293/00 (2006.01)
(Continued)

(52) U.S. Cl.
CPC ............. C08J 9/103 (2013.01); C08F 293/00 (2013.01); C08L 53/02 (2013.01); C08J 2353/02 (2013.01); C08J 2431/04 (2013.01)

(58) Field of Classification Search
CPC .... C08J 9/103; C08J 2353/02; C08J 2431/04; C08J 2203/04; C08J 9/0061;
(Continued)

(56) References Cited

U.S. PATENT DOCUMENTS 4,102,849 A * 7/1978 Bouton ................. C08L 53/025
524/575
4,778,852 A * 10/1988 Futamura ................. C08K 3/06
524/505
(Continued)

FOREIGN PATENT DOCUMENTS

CN 109071860 A 12/2018
JP 2004043746 A 2/2004
(Continued)

OTHER PUBLICATIONS

Kraton Giving Innovators Their Edge, "Polymers and Compounds".
(Continued)

*Primary Examiner* — K. Boyle
(74) *Attorney, Agent, or Firm* — BACON & THOMAS, PLLC

(57) ABSTRACT

A crosslinkable and foamable composition is provided, which comprises a hydrogenated styrenic diblock copolymer, a free radical initiator and a foaming agent, wherein the hydrogenated styrenic diblock copolymer comprises: a first block comprising a conjugated diene monomer unit; and a second block comprising a styrene unit, wherein the hydrogenated styrenic diblock copolymer comprises 10 to 60 wt % of the styrene unit, 50 mol % or more of the conjugated diene monomer unit is hydrogenated, and the hydrogenated styrenic diblock copolymer has a weight average molecular weight of 30000 to 200000. In addition, a foam obtained by crosslinking and foaming the aforesaid crosslinkable and foamable composition is also provided.

31 Claims, 1 Drawing Sheet

(51) Int. Cl.
*C08J 9/04* (2006.01)
*C08J 9/10* (2006.01)

(58) Field of Classification Search
CPC ............. C08J 2201/026; C08J 2423/08; C08F
293/00; C08F 297/04; C08F 297/046;
C08L 53/02; C08L 2203/14; C08L
23/0853; C08L 53/025
See application file for complete search history.

(56) References Cited

U.S. PATENT DOCUMENTS

| | | | | |
|---|---|---|---|---|
| 2011/0275731 | A1 * | 11/2011 | Shimizu | C08J 9/10 |
| | | | | 521/139 |
| 2018/0094129 | A1 * | 4/2018 | Baghdadi | A43B 1/10 |
| 2022/0389210 | A1 | 12/2022 | Chou et al. | |
| 2025/0145755 | A1 | 5/2025 | Chou et al. | |

FOREIGN PATENT DOCUMENTS

| | | | | |
|---|---|---|---|---|
| JP | 2013010833 | A | * | 1/2013 |
| JP | 2017088748 | A | * | 5/2017 |
| JP | 2018028108 | A | | 2/2018 |
| TW | 201038639 | A | | 11/2010 |

OTHER PUBLICATIONS

Tamboli et al—"Crosslinked Polyethelene" Indian Journal of Chemical Technology, vol. 11, Nov. 2004, pp. 853-864.
"Dicumyl Peroxide, CAS 762-12-9: A Comprehensive Technical Guide" Sep. 23, 2025.
"Di-Cup Dicumyl Peroxide" pp. 1-4.
"Hydrogenated Styenic Thermoplastic Elastomer (SEBS)".

* cited by examiner

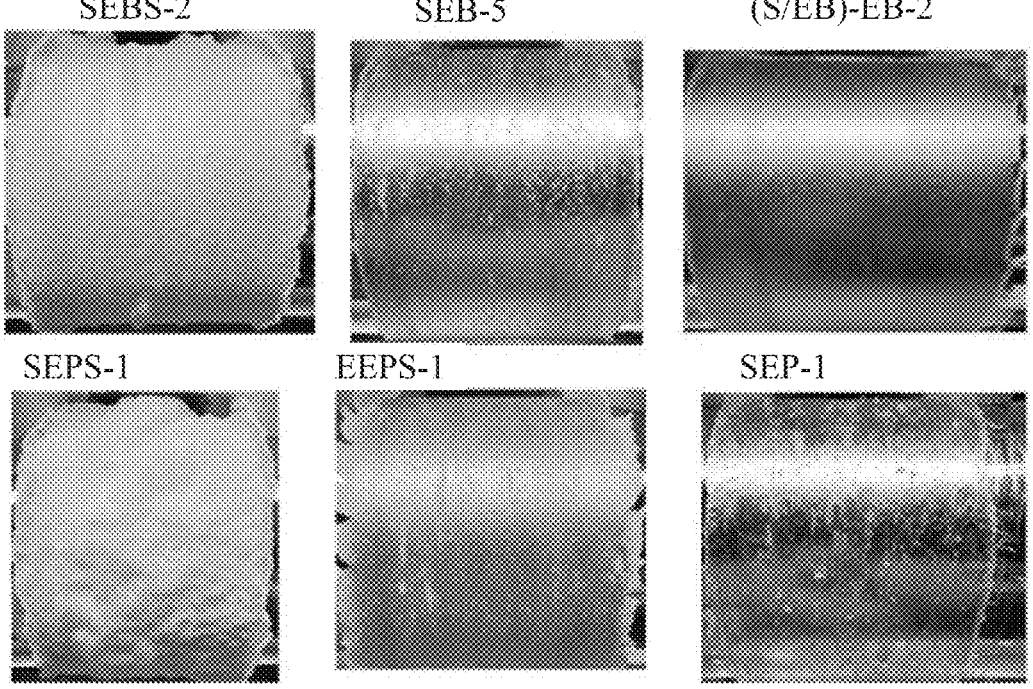

CROSSLINKABLE AND FOAMABLE COMPOSITION, FOAM OBTAINED BY THE SAME, COMPOSITION FOR FOAMING AND USE THEREOF

CROSS REFERENCE TO RELATED APPLICATION

This application claims the benefit of filing date of U.S. Provisional Application Ser. No. 63/194,198, filed May 28, 2021 under 35 USC § 119(e)(1).

BACKGROUND

1. Field

The present disclosure relates to a crosslinkable and foamable composition and a foam obtained by crosslinking and foaming the aforesaid crosslinkable and foamable composition.

2. Description of Related Art

Ethylene copolymers, such as ethylene-vinyl acetate (EVA), are widely used to fabricate foam products in footwear applications in a process involving first incorporate peroxide initiators and chemical blowing agents at a temperature of about 120° C. or less, and then molding in a mold for crosslinking the foam composition and then foaming at a temperature of about from 140° C. to 190° C. Ethylene α-olefin copolymers are also used for footwear foam applications. For example, U.S. Pat. No. 5,407,965 disclosed crosslinked substantially linear ethylene copolymer composition for foam application. U.S. Pat. No. 7,666,918B2 discloses a foamable compositions and foams comprise an ethylene/α-olefin interpolymer with multi-block of soft block and hard block. Blends of ethylene copolymers are also used for fabricating light weight foam for balancing foam properties.

Thermoplastic elastomers (TPE), such as thermoplastic polyurethane (TPU) and Polyether block amide (PEBAX), is another category of materials suitable for producing light weight foam, such as footwear foam. TPE behaves like thermoset rubber, but melt processable like thermoplastics. It is composed of two phases: a soft phase which provides elastic properties, and a hard phase, which aggregates to form a physical crosslinking network. TPE of selected compositions may have the inherent melt strength for foaming without crosslinking, and the resulting foam has desirable foam properties. In general, TPE materials, such as thermoplastic polyurethane, cannot be fabricated into foam in the incumbent foaming process for making EVA foam. For example, EP3259306A1 discloses a process for producing foamed thermoplastic polyurethane particles, which contain impregnated physical blowing agents, such as nitrogen, to foam into bead foam.

Styrenic block copolymer (SBC) is a category of TPE suitable for producing light weight foam in the conventional footwear foam process. For producing SBC based foam, a peroxide crosslinking is needed for gaining melt strength for foaming. SBC with a glass transition temperature around 100° C. can be processed at temperatures of less than 120° C. for incorporating peroxide and chemical blowing agent, and the chemical structure of the soft block, namely butadiene, and/or isoprene, and the hydrogenated versions, can be crosslinked with peroxide initiator. Thus, styrenic block copolymers, such as SBS and SEBS, have been used for footwear foam, especially for modifying ethylene copolymers for attaining improved properties, such as impact resilience.

There is a continued need to improve EVA foam properties, such as attaining high impact resilience without compromising other properties, such as hardness. Also a need exists for innovated foam resins for attaining novel foam properties in a cost effective manner.

SUMMARY

The objective of the present disclosure is twofold. The first objective is to develop a diblock copolymer that is most suitable for footwear foam applications. The foam comprising the styrenic diblock copolymer manifests the inherent merits of styrenic block copolymer materials, such as high impact resilience, and which foam is produced in a foam production process involving a step of incorporating free radical initiators and foaming agents into the crosslinkable and foamable composition at a temperature of about 120° C. or lower, and then injecting molding of the crosslinkable and foamable composition containing the free radical initiators and foaming agents into an compression mold for crosslinking, wherein the crosslinking in the mold is at a temperature from about 150° C. to 190° C.

The second objective is to develop a technology for modifying the foam properties of ethylene copolymer, such as EVA, for attaining high impact resilience while maintaining other mechanical properties.

While not bounded by theory, the present disclosure is based on the discovery that a hydrogenated styrenic diblock copolymer is most suitable for attaining the objectives of the present disclosure as described above.

In general practice, SBC is produced by anionic polymerization to first prepare a diblock copolymer of one hard styrene block and one soft block, such as butadiene or isoprene block, and then via either coupling or continued polymerization to form linear A-B-A type or star multi-block type block copolymer. Hydrogenated SBC, such as SEBS, further enhances the mechanical properties and weatherability. SBC block copolymers as a category of TPE is widely used for many applications including footwear foam. Hydrogenated SBC, such as hydrogenated SEBS is preferred for footwear foam applications.

In A-B type styrenic diblock copolymer, the hard styrene blocks are not tied up to form a physical crosslinking like a multi-block copolymer. It does not have the characteristics of a thermoplastic elastomer, such as elasticity. In short, the styrenic diblock copolymer is not considered a thermoplastic elastomer, and it has limited commercial usage. For example, very few commercial products of styrenic diblock copolymers are available from global SBC producers. Styrenic diblock copolymers are most used for adhesive, coating, or modifiers, where mechanical strength and elasticity are not of primary importance. Unexpectedly and surprisingly, it was found that the A-B type styrenic diblock copolymer is well suited for footwear foam resulting from being not a TPE. It has a clear advantage than multi-block copolymer in peroxide curing, foam compounding process, and compatibility with other resins. The benefits of employing a styrenic diblock copolymer for footwear foam can be further illustrated as follows.

For making into footwear foam, SBC, such as SEBS, is required to be crosslinked mainly by free radical initiators for enhancing the melt strength for foaming. In other word, a chemical crosslinking by peroxide crosslinking is introduced into the pre-existing physical crosslinking of SEBS.

While the SEBS structure of the hard styrene block end-capped the soft block in both ends renders desirable thermoplastic elastomer characteristics, the structure in fact makes the crosslinking of the middle block more difficult. In other word, the structural constraint imposed by the end-capped hard styrene blocks makes the crosslinking of the soft butadiene middle block topologically more difficult. After the middle block is crosslinked at elevated temperatures, such as 160° C. to 180° C., the reformation of SBC micro-phase morphology from melt, is also constrained by the newly introduced chemical crosslinking.

On the other hand, the styrenic diblock copolymer is free of the pre-existing physical crosslinking network. Thus, in peroxide curing of styrenic diblock copolymer, a newly formed crosslinking by peroxide crosslinking is formed without the topological constrain of a triblock copolymer. It was discovered that the styrenic diblock copolymer after peroxide crosslinking turns into a three dimension network block copolymer with enhanced mechanical properties and optimized melt strength for foaming. The loose styrene blocks of the diblock are tied into a network only after peroxide crosslinking. The peroxide crosslinking of a diblock serves to provide not only to form a chemical crosslinking via peroxide crosslinking, also to form a physical crosslinking network as a consequence of the crosslinking.

For manufacturing footwear foam, in the step or steps incorporating peroxide and foaming agent, and then injecting the compounded sample into mold for foaming, the processing temperatures have to be confined to the temperatures not causing premature decomposition of both peroxide and the foaming agent. For the most prevailing peroxides, such as dicumyl peroxide (DCP) and bis(1-(tert-butylperoxy)-1-methylethyl)-benzene (BIPB), and the foaming agent, such as azodicarbonamide, used for manufacturing footwear foam, the upper limit temperature for compounding is about 120° C. The glass transition temperature (Tg) of hard styrene block is about 100° C., which imposes a narrow processing window for SEBS. In addition, the multi-block copolymer in general has a high melt viscosity at the temperature of about 120° C. due to the high shear thinning melt rheology of being a TPE. Thus, hydrogenated SEBS can be used for making footwear foams, and the selection of SEBS is largely confined to samples of lower weight average molecular weight (Mw) and lower content of styrene content.

Unexpectedly it was found that a styrenic diblock copolymer can be much readily compounded at the temperatures not to cause the decomposition of peroxide and foaming agent. This is an important feature in footwear foam production.

In addition, a styrenic diblock copolymer may have an excellent compatibility with other ethylene copolymers, such as EVA. It is known that A-B type diblock has a better self-assembly capability originated from the thermodynamic incompatibility between A-B two blocks of the copolymer. And this is the reason that A-B diblock copolymer is often used as compatibilizer of two dissimilar polymers.

According to the objectives of the present disclosure, the present disclosure provides a crosslinkable and foamable composition, a foam obtained by crosslinking and foaming the same and the preparation thereof as described below.

The present disclosure provides a crosslinkable and foamable composition, which comprises a hydrogenated styrenic diblock copolymer, a free radical initiator and a foaming agent. The hydrogenated styrenic diblock copolymer comprises: a first block comprising a conjugated diene monomer unit; and a second block comprising a styrene unit. Herein, the hydrogenated styrenic diblock copolymer comprises 10 to 60 wt % of the styrene unit, 50 mol % or more of the conjugated diene monomer unit is hydrogenated, and the hydrogenated styrenic diblock copolymer has a weight average molecular weight of 30000 to 200000. The present disclosure also provides a foam or a footwear component obtained by crosslinking and foaming the aforesaid crosslinkable and foamable compositions. Thus, the obtained foam or the obtained footwear component comprises the hydrogenated styrenic diblock copolymer, and has the features of the aforesaid hydrogenated styrenic diblock copolymer.

The present disclosure also provides another crosslinkable and foamable composition, which comprises a hydrogenated styrenic diblock copolymer, an ethylene copolymer, a free radical initiator and a foaming agent. The features of the hydrogenated styrenic diblock copolymer are as described above and are not described again. In addition, a weight ratio of the ethylene copolymer to the hydrogenated styrenic diblock copolymer is from 50/50 to 95/5. The present disclosure also provides a foam or a footwear component obtained by crosslinking and foaming the aforesaid crosslinkable and foamable compositions. Thus, the obtained foam or the obtained footwear component comprises the hydrogenated styrenic diblock copolymer and the ethylene copolymer, and has the features of the aforesaid hydrogenated styrenic diblock copolymer and the weight ratio of the ethylene copolymer to the hydrogenated styrenic diblock copolymer.

The present disclosure further provides a composition for foaming, which comprises a hydrogenated styrenic diblock copolymer. The features of the hydrogenated styrenic diblock copolymer are as described above and are not described again. In addition, the present disclosure also provides a use of the aforesaid composition for preparing a foam.

The details of one or more embodiments of the disclosure are set forth in the description below. Other features, objects, and advantages of the disclosure will be apparent from the description and from the claims.

BRIEF DESCRIPTION OF THE DRAWINGS

FIG. 1 shows the photos of the band formation of the samples on the rotating roller taken during the evaluation of compounding capability.

DETAILED DESCRIPTION

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

In the present disclosure, except otherwise specified, the terms "almost", "about" and "approximately" usually mean the acceptable error in the specified value determined by a skilled person in the art, and the error depends on how the value is measured or determined. In some embodiments, the terms "almost", "about" and "approximately" mean within 1, 2, 3 or 4 standard deviations. In some embodiments, the terms "almost", "about" and "approximately" mean within ±20%, within ±15%, within ±10%, within ±9%, within ±8%, within ±7%, within ±6%, within ±5%, within ±4%, within ±3%, within ±2%, within ±1%, within ±0.5%, within ±0.05% or less of a given value or range. The quantity given here is an approximate quantity, that is, without specifying "almost", "about" and "approximately", it can still imply "almost", "about" and "approximately". In addition, the terms "in a range of a first value to a second value", "from a first value to a second value" and the like mean the said range comprises the first value, the second value and other values between the first value and the second value.

In addition, the features in different embodiments of the present disclosure can be mixed to form another embodiment.

In some embodiments, the crosslinkable and foamable composition may comprise a hydrogenated styrenic diblock copolymer, a free radical initiator and a foaming agent. The hydrogenated styrenic diblock copolymer may comprise: a first block comprising a conjugated diene monomer unit; and a second block comprising a styrene unit. Herein, the hydrogenated styrenic diblock copolymer may comprise 10 to 60 wt % of the styrene unit, 50 mol % or more of the conjugated diene monomer unit may be hydrogenated, and the hydrogenated styrenic diblock copolymer may have a weight average molecular weight of 30000 to 200000.

In some embodiments, the crosslinkable and foamable composition may comprise a hydrogenated styrenic diblock copolymer, an ethylene copolymer, a free radical initiator and a foaming agent. The features of the hydrogenated styrenic diblock copolymer are as described above and are not described again. In addition, a weight ratio of the ethylene copolymer to the hydrogenated styrenic diblock copolymer may be from 50/50 to 95/5.

In some embodiments, a foam obtained by crosslinking and foaming any of the aforesaid crosslinkable and foamable compositions is provided.

In some embodiments, a footwear component obtained by crosslinking and foaming any of the aforesaid crosslinkable and foamable compositions is provided.

In some embodiments, the composition for foaming may comprise a hydrogenated styrenic diblock copolymer. The features of the hydrogenated styrenic diblock copolymer are as described above and are not described again.

In some embodiments, a use of the aforesaid composition for foaming is applied for preparing a foam.

Hereinafter, the components of the aforesaid crosslinkable and foamable composition, the foam or the footwear component obtained by crosslinking and foaming any of the aforesaid crosslinkable and foamable compositions, and the preparation thereof are described in detail. In addition, the component of the aforesaid composition for foaming is also described in detail.

Hydrogenated Styrenic Diblock Copolymer

The hydrogenated styrenic diblock copolymer of the present disclosure is a diblock copolymer comprising a first block comprising a conjugated diene monomer unit, and a second block comprising a styrene unit.

In some embodiments, the hydrogenated styrenic diblock copolymer may comprise about 10 to 60 wt % of the styrene unit based on the total weight of the hydrogenated styrenic diblock copolymer. When the crosslinked foam is prepared by the crosslinkable and foamable composition with the content of the styrene unit more than 60 wt %, the impact resilience or the compression set of the crosslinked foam is poor. When the crosslinked foam is prepared by the crosslinkable and foamable composition with the content of the styrene unit less than 10 wt %, the mechanical properties (for example, tensile strength) of the crosslinked foam is poor.

In some embodiments, for the purpose of making a crosslinked foam with balance mechanical properties, the hydrogenated styrenic diblock copolymer may comprise about 10 to 50 wt % of the styrene unit based on the total weight of the hydrogenated styrenic diblock copolymer, and the rest of the hydrogenated styrenic diblock copolymer is the conjugated diene monomer unit. Within this range, the crosslinked foam can be expected to have balanced mechanical properties. In some embodiments, the hydrogenated styrenic diblock copolymer may comprise about, for example, 10 to 55 wt %, 15 to 55 wt %, 15 to 50 wt %, 18 to 50 wt %, 18 to 45 wt %, 18 to 40 wt %, 18 to 35 wt % or 18 to 33 wt % of the styrene unit, and the rest of the hydrogenated styrenic diblock copolymer is the conjugated diene monomer unit.

In some embodiments, the hydrogenated styrenic diblock copolymer may have a weight average molecular weight of about 30000 to 200000. If the weight average molecular weight of the hydrogenated styrenic diblock copolymer is less than 30000, the hydrogenated styrenic diblock copolymer renders poor mechanical properties of the resulting foam. If the weight average molecular weight of the hydrogenated styrenic diblock copolymer is more than 200000, the hydrogenated styrenic diblock copolymer is difficult to process.

In some embodiments, the hydrogenated styrenic diblock copolymer may have a weight average molecular weight of about, for example, 40000 to 200000, 40000 to 190000, 50000 to 190000, 50000 to 180000, 60000 to 180000, 60000 to 170000, 60000 to 160000, 60000 to 150000, 60000 to 140000, 60000 to 130000, 60000 to 120000, 60000 to 110000, 60000 to 100000, 60000 to 90000, 65000 to 90000, 65000 to 85000, 70000 to 85000 or 70000 to 80000.

In some embodiments, the conjugated diene monomer unit contained in the hydrogenated styrenic diblock copolymer is not particularly limited, and known conjugated diene monomer unit can be used. In some embodiments, the first block may be a polymer block of a butadiene unit, an isoprene unit, or a mixture thereof. In some embodiments, the first block may be a polymer block of a butadiene unit. In some embodiments, the first block may be a polymer block of an isoprene unit. In some embodiments, the first block may be a polymer block of a butadiene unit and an isoprene unit.

In some embodiments, the second block may be a polymer block of a styrene unit. In some embodiments, the second block may be a polymer block of a styrene unit and a conjugated diene monomer unit, wherein the conjugated diene monomer unit may be a butadiene unit, an isoprene unit, or a mixture thereof and a content of the conjugated diene monomer unit in the second block may be less than or equal to 15 wt % based on a total weight of the second block. In some embodiments, the content of the conjugated diene monomer unit in the second block may be in the range of about 0.5 to 15 wt %, 0.5 to 14 wt %, 0.5 to 13 wt %, 0.5 to 12 wt %, 0.5 to 11 wt % or 0.5 to 10 wt % based on a total weight of the second block.

In some embodiments, the first block may be a polymer block of a butadiene unit, an isoprene unit, or a mixture thereof, and the second block may be a polymer block of a styrene unit.

In some embodiments, the first block may be a polymer block of a butadiene unit, an isoprene unit, or a mixture thereof, and the second block may be a polymer block of a styrene unit and a conjugated diene monomer unit, wherein the conjugated diene monomer unit may be a butadiene unit, an isoprene unit, or a mixture thereof, and a content of the conjugated diene monomer unit in the second block may be less than or equal to 15 wt % based on a total weight of the second block.

In some embodiments, the first block may be a polymer block of a butadiene unit, and the second block may be a polymer block of a styrene unit.

In some embodiments, the first block may be a polymer block of a butadiene unit, and the second block may a polymer block of a styrene unit and a butadiene unit, wherein a content of the butadiene unit in the second block may be less than or equal to 15 wt % based on a total weight of the second block.

In some embodiments, the first block may be a polymer block of an isoprene unit, and the second block may be a polymer block of a styrene unit.

In some embodiments, the first block may be a polymer block of a butadiene unit and an isoprene unit, and the second block may be a polymer block of a styrene unit.

In some embodiments, for example, when the first block and/or the second block comprises the butadiene unit, a 1,2-vinyl bond content in the conjugated diene monomer unit (i.e. the butadiene) may be in the range of about 5 to 60 mol % prior to hydrogenation. If the 1,2-vinyl bond content in the conjugated diene monomer unit is less than 5 mol % or more than 60 mol %, the impact resilience or the compression set of the crosslinked foam is poor.

In some embodiments, the 1,2-vinyl bond content in the conjugated diene monomer unit may be in the range of about, for example, 5 to 55 mol %, 5 to 50 mol %, 10 to 50 mol %, 15 to 50 mol %, 20 to 50 mol %, 25 to 50 mol %, 30 to 50 mol %, 35 to 50 mol % or 35 to 45 mol % prior to hydrogenation.

In some embodiments that, for example, when the first block and/or the second block comprises the isoprene unit, a 3,4-vinyl bond content in the conjugated diene monomer unit (i.e. the isoprene) may be in the range of about 5 to 40 mol % prior to hydrogenation. In some embodiments, the 3,4-vinyl bond content in the conjugated diene monomer unit (i.e. the isoprene) may be in the range of about, for example, 5 to 35 mol %, 5 to 30 mol %, 5 to 25 mol %, 5 to 20 mol % or 5 to 15 mol % prior to hydrogenation.

In some embodiments, about 50 mol % or more of the conjugated diene monomer unit of the styrenic diblock copolymer is hydrogenated after hydrogenation. In some embodiments, about 50 to 95 mol % of the conjugated diene monomer unit is hydrogenated after hydrogenation. In some embodiments, about, for example, 55 to 95 mol %, 60 to 95 mol %, 60 to 90 mol %, 65 to 90 mol % or 70 to 90 mol % of the conjugated diene monomer unit is hydrogenated after hydrogenation. If the hydrogenation degree is too low, the styrenic diblock copolymer cannot easily co-crosslink with the ethylene copolymer.

Herein, the hydrogenation degree refers to the overall hydrogenation degree of the conjugated diene monomer unit(s) in the hydrogenated styrenic diblock copolymer. For example, in the case where the first block is a polymer block of butadiene and/or isoprene as well as the second block is a polymer block of styrene, the hydrogenation degree is the hydrogenation degree of the polymer block of butadiene and/or isoprene. In the case where the first block is a polymer block of butadiene and/or isoprene as well as the second block is a polymer block of styrene and butadiene and/or isoprene, the hydrogenation degree is the overall hydrogenation degree of the butadiene and/or isoprene units in the polymer block of butadiene and/or isoprene and the polymer block of styrene and butadiene and/or isoprene.

The method for manufacturing the styrenic diblock copolymer prior to hydrogenation is not particularly limited, and any known method can be used. Among the polymerization method, living anionic polymerization may be used, performed in a hydrocarbon solvent, and initiated by an organo-alkali metal compound. For example, the above-mentioned polymer synthesis steps are clearly described in U.S. Pat. No. 3,823,203. The hydrocarbon solvent is not particularly limited, and any known solvent can be used. For instance, the hydrocarbon solvent may include aliphatic hydrocarbons such as n-hexane; alicyclic hydrocarbons such as cyclo-hexane; aromatic hydrocarbons such as xylene. The above-mentioned hydrocarbon solvents can be used singly or in combinations of two or more.

The initiator is not particularly limited, and initiators that are known to have anionic polymerization activity with vinyl aromatic monomers, such as styrene, and conjugated diene monomers, such as butadiene, can be applied such as aliphatic hydrocarbon alkali metal compounds, aromatic hydrocarbon alkali metal compounds, and organic amino alkali metal compounds. Alkali metals used as the initiator may include lithium, sodium, and potassium. In some embodiments, the initiator may be aliphatic hydrocarbon alkali metal, such as n-butyl lithium.

The polymerization process of preparing the styrenic diblock copolymer may be carried out similar to those used for anionic polymerizations. The polymerization may be carried out at a temperature from around 0° C. to around 180° C., more preferably from about 30° C. to about 150° C., and the most preferably from about 30° C. to about 90° C. It is carried out in an inert atmosphere preferably nitrogen, and may also be accomplished under pressure within the range of from about 0.5 to about bars. The polymerization process generally requires less than 12 hours, depending upon the temperature, the concentration of the monomer components, the molecular weight of the polymer, etc.

The hydrogenation of the styrenic diblock copolymer can be carried out in known hydrogenation processes. For example, such hydrogenation has been accomplished using methods such as reported in U.S. Pat. Nos. 3,595,942 and 3,700,633. These methods of hydrogenation employ suitable catalysts. This mentioned catalyst may comprise a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum.

The hydrogenation process is not particularly limited, but the hydrogenation is typically carried out at a temperature from 0° C. to 180° C., and more preferably from 30° C. to 150° C. The hydrogen pressure used in this process is not particularly limited, but is typically from 0.1 to 20 MPa, 0.2 to 15 MPa or 0.3 to 5 MPa. The reaction time is typically from 1 minute to 10 hours or from 10 minutes to 5 hours.

The hydrogenation process may be performed by a batch process, continuous process, or a combination thereof. If it is necessary, the catalyst residue may be removed. The hydrogenated polymer may be isolated by pouring into hot water while stirring, and the organic solvent may be removed by steam stripping.

In some embodiments, the microstructure of the conjugated diene segment of the hydrogenated styrenic diblock copolymer, such as vinyl bond content and the styrene content prior to hydrogenation, and the degree of hydrogenation after hydrogenation, may be measured using proton nuclear magnetic resonance ($^1$H-NMR) method. Moreover, the weight average molecular weight may be determined by gel permeation chromatography (GPC).

A typical synthesis method of preparing the hydrogenated styrene-butadiene diblock copolymer is simply described here, but the present disclosure is not limited thereto. First, cyclohexane as the solvent and n-butyllithium as the initiator are charged into a reactor equipped with a heater and a stirrer. Secondly, styrene is added into the solvent to carry out the anionic polymerization. Thirdly, butadiene is added into the reactor, and the reaction mixture is further polymerized to form a styrene-butadiene diblock copolymer structure. This block copolymer is then hydrogenated in a pressure vessel using a nickel-2-ethylhexanoate/TEAL catalyst and hydrogen gas. After a desired amount of the butadiene block is hydrogenated, the hydrogenation reaction is terminated. The obtained sample is washed with hot acidic water to remove residual catalyst.

Moreover, for the purpose of modifying the foam properties, the hydrogenated styrenic diblock copolymer may selectively contain a hydrogenated styrene multi-block copolymer, such as triblock, of similar composition up to 30% by weight. The styrenic multi-block copolymer may have the styrene content of 10 to 40 wt %, a weight average molecular weight of about 30000 to 80000, the 1,2-vinyl bond content of 10 to 50 mol % of the conjugated diene monomer unit prior to hydrogenation, and the hydrogenation of 60 to 95 mol % of the conjugated diene monomer unit. The weight ratio of the hydrogenated styrenic multi-block copolymer to the hydrogenated styrenic diblock copolymer is dependent on the foam process, and the foam properties required for end applications.

Ethylene Copolymer

In some embodiments of the present disclosure, the crosslinkable and foamable composition may comprise the aforesaid hydrogenated styrenic diblock copolymer and an ethylene copolymer.

In some embodiments, a weight ratio of the ethylene copolymer to the hydrogenated styrenic diblock copolymer may be from 50/50 to 95/5. In some embodiments, the weight ratio of the ethylene copolymer to the hydrogenated styrenic diblock copolymer may be from, for example, 50/50 to 90/10, 60/40 to 90/10, 65/35 to 90/10 or 70/30 to 90/10.

In the present disclosure, the ethylene copolymer is not particularly limited, and a known ethylene copolymer can be used. For instance, the suitable ethylene copolymer may comprise polyethylene (PE), an ethylene-vinyl acetate copolymer (EVA) obtainable by copolymerization of ethylene and vinyl acetate, an ethylene-α-olefin-based copolymer obtainable by random or block copolymerization of ethylene and C$_{3-10}$ α-olefins, or a combination thereof.

In some embodiments, the ethylene copolymer may be the polyethylene, which may be high density polyethylene, low density polyethylene or a combination thereof.

In some embodiments, the ethylene copolymer may be the ethylene-vinyl acetate copolymer, and a content of vinyl acetate is in a range of about 15 to 40 wt % based on a total weight of the ethylene copolymer. In some embodiments, the content of vinyl acetate may be in a range of about 15 to 35 wt %, 15 to 30 wt %, 18 to 30 wt % or 20 to 30 wt %, based on a total weight of the ethylene copolymer.

In some embodiments, the ethylene copolymer may be the ethylene-α-olefin-based copolymer, wherein the α-olefin may include 1-butene, 1-pentene, 1-hexene, 1-octene, the like or a combination thereof.

Free Radical Initiator

In some embodiments of the present disclosure, the crosslinkable and foamable composition may further comprise a free radical initiator. Herein, the free radical initiator used for crosslinking the crosslinkable and foamable composition is not particularly limited, and any known free radical initiator may be used.

In some embodiments, the free radical initiator may be an organic peroxide.

In some embodiments, the organic peroxide may be selected from the group consisting of dicumyl peroxide, 2,5-dimethyl-2,5-di-(t-butylperoxy)hexane, bis(1-(tert-butylperoxy)-1-methylethyl)-benzene and a combination thereof. In some embodiments, the organic peroxide may be bis(1-(tert-butylperoxy)-1-methylethyl)-benzene. However, the present disclosure is not limited thereto.

The used amount of the free radical initiator is not particularly limited. In some embodiments, the used amount of the free radical initiator may be from about 0.01 to 10 wt %, 0.01 to 9 wt %, 0.01 to 8 wt %, 0.01 to 7 wt %, 0.01 to 6 wt %, 0.01 to 5 wt %, 0.01 to 4 wt %, 0.05 to 4 wt %, 0.05 to 3 wt %, 0.1 to 3 wt %, 0.1 to 2.5 wt %, 0.1 to 2 wt %, 0.1 to 1.5 wt % or 0.1 to 1 wt % based on the total weight of the crosslinkable and foamable composition.

Foaming Agent

In some embodiments of the present disclosure, the crosslinkable and foamable composition may further comprise a foaming agent. Herein, the foaming agent is not particularly limited, and any known foaming agent may be used. For example, the foaming agent may be a chemical foaming agent, a physical foaming agent or a combination thereof.

In some embodiment, the foaming agent is a chemical foaming agent.

In some embodiments, the foaming agent may comprise an organic forming agent such as azodicarbonamide (ADCA), bis(1-(tert-butylperoxy)-1-methylethyl)-benzene, 4,4'-oxybis(benzenesulfonylhydrazide), p-toluenesulfonyl semicarbazide, N, N'-dinitrosopentamethylenetetramine, diphenylsulfone-3,3'-disulfonyl hydrazide (DPSDSH), tri-hydrazinotriazine or combination thereof; or an inorganic type thermal decomposable foaming agent, such as sodium hydrogencarbonate, ammonium hydrogencarbonate, sodium carbonate, ammonium carbonate or a combination thereof. Herein, the organic forming agent and the inorganic type thermal decomposable foaming agent may be used alone or together. In some embodiments, the foaming agent may be azodicarbonamide. However, the present disclosure is not limited thereto.

The used amount of the foaming agent is not particularly limited. In some embodiments, the used amount of the foaming agent may be from about 0.5 to 10 wt %, 0.5 to 9 wt %, 0.5 to 8 wt %, 0.5 to 7 wt %, 0.5 to 6 wt %, 0.5 to 5 wt % or 1 to 5 wt % based on the total weight of the crosslinkable and foamable composition.

In some embodiments, the foaming agent may be a physical foaming agent, such as nitrogen, carbon dioxide, alkanes, cycloalkanes, dialkyl ethers, cycloalkylene ethers, fluoroalkanes, hydrofluoroolefins, hydrochlorofluoroolefins, or a combination thereof.

Other Additives

In some embodiments of the present disclosure, if necessary, in addition to the above-mentioned components, the crosslinkable and foamable composition may further selectively comprise other additives, for example, a crosslinking co-agent, an organometallic compound, fillers, a thermal stabilizer, a weather stabilizer, pigments, etc. However, the present disclosure is not limited thereto.

In some embodiments of the present disclosure, for the purpose of accelerating the rate of crosslinking reaction, the crosslinkable and foamable composition may further comprise a crosslinking co-agent. For example, the crosslinking co-agent may comprise, but is not limited to, triallyl isocyanurate, triallyl cyanurate, ethylene glycol dimethacrylate, vinyl butyrate, etc.

In some embodiments of the present disclosure, for the purpose of making crosslinked foam pores be finer or more uniform, the crosslinkable and foamable composition may further comprise an organometallic compound. For example, the organometallic compound may comprise, but is not limited to, zinc diacrylate or zinc dimethacrylate, which can also serve as a crosslinking co-agent.

In some embodiments of the present disclosure, for the purpose of cost-saving, adjusting hardness or modulus, or nucleation, the crosslinkable and foamable composition may further comprise fillers. For example, the fillers may comprise, but are not limited to, clay, silicon dioxide, talc, titanium dioxide, zinc oxide, calcium carbonate, etc.

In some embodiments of the present disclosure, for the purpose of enhancing the foam product durability, the crosslinkable and foamable composition may further comprise a thermal stabilizer, a weather stabilizer or a combination thereof. For example, the thermal stabilizer may comprise, but is not limited to, the phosphorus-based type thermal stabilizer such as Irgafos 168. For example, the weather stabilizer may comprise, but is not limited to, the hindered phenol-based type weather stabilizer such as pentaerythritol tetrakis[3-[3,5-di-tert-butyl-4-hydroxyphenyl]propionate].

In some embodiments of the present disclosure, the crosslinkable and foamable composition may further comprise pigments. For example, the pigments may comprise, but are not limited to, azo-based type pigments, phthalocyanine-based type pigments, oxide-based type pigments, chromate-based type pigments, molybdate-based type pigments, inorganic pigments, or carbon black.

Preparation of Crosslinkable and Foamable Composition

The crosslinkable and foamable composition of the present disclosure may be produced by using a kneading machine to first melt and blend the above-mentioned components of the hydrogenated styrene diblock copolymer, the ethylene copolymer or a combination thereof, and then incorporate the free radical initiator and the foaming agent, and other additives, such as fillers are included. Before the addition of the free radical initiator and the foaming agent, the operation is carried out below 120° C. to avoid the premature decomposition of the free radical initiator or the foaming agent.

The method of melt mixing and blending is not particularly limited, and known methods can be used. For example, an extruder such as a single-screw extruder, a twin-screw extruder, a multi-screw extruder, a Henschel mixer, a Banbury mixer, a roll mill, and a kneading can be applied to the present disclosure. In some embodiments, the melt mixing method is performed by using a kneader.

After the melt-mixing process, the shape of the crosslinkable and foamable composition of the present disclosure is not particularly limited. For instance, it may be formed into a pellet shape, a flake shape, a strand shape, or a chip shape, etc. For example, it may be mixing the components by a granulator or the like to form a pellet. For example, after kneading each component of the composition, a roll mill is used to form a sheet. Thereby, an expandable sheet, which is not crosslinked and is not foamed, will be prepared, wherein the expandable sheet comprises any one of the crosslinkable and foamable composition described above.

Preparation of Crosslinked Foam

The crosslinkable and foamable composition provided by the present disclosure can be crosslinked and foamed to obtain the foam of the present disclosure.

The method of crosslinking and foaming is not particularly limited, and any known method may be used. Here is an example of foaming the crosslinkable and foamable composition of the present disclosure in sheet form obtained by sheeting the crosslinkable and foamable composition. The crosslinkable and foamable sheet is cut into a size in the range of 1.0 to 1.2 times the volume of the mold, and inserted it into the mold. In a typical foam molding operation, the mold is kept at about 150 to 200° C., the mold clamping pressure of 30 to 300 kgf/cm$^2$, and the holding time of 3 to 50 minutes. In the mold, the crosslinking reaction is carried out and the foaming agent is decomposed at the same time. After waiting the holding time and opening the mold, the crosslinkable and foamable composition is made into crosslinked foam. In industrial production of foam, an injection molding process of melt injecting the crosslinkable and foamable composition into a mold for crosslinking and foaming may be used.

The crosslinked foam obtained from the crosslinkable and foamable composition may have a specific gravity (also called density) from about 0.05 to 0.5 g/cm$^3$, for example, 0.05 to 0.45 g/cm$^3$, 0.05 to 0.4 g/cm$^3$, 0.1 to 0.4 g/cm$^3$, 0.1 to 0.35 g/cm$^3$, 0.1 to 0.3 g/cm$^3$ or 0.1 to 0.25 g/cm$^3$. However, the present disclosure is not limited thereto, and the specific gravity of the foam may be adjusted by modifying the components of the crosslinkable and foamable composition.

The crosslinked foam obtained from the crosslinkable and foamable composition may have an impact resilience of about 40 to 80%. In some embodiments where the foam is obtained from the crosslinkable and foamable composition comprising hydrogenated styrenic diblock copolymer, the foam may have the impact resilience of about 40 to 80%, 45 to 80%, 50 to 80% or 55 to 80%. In some embodiments where the foam is obtained from the crosslinkable and foamable composition comprising hydrogenated styrenic diblock copolymer and the ethylene copolymer, the foam may have the impact resilience of about 40 to 80%, 45 to 80% or 50 to 80%. However, the present disclosure is not limited thereto, and the impact resilience of the foam may be adjusted by modifying the components of the crosslinkable and foamable composition.

The crosslinked foam obtained from the crosslinkable and foamable composition may have a hardness (Asker C) of about 20 to 80. In some embodiments where the foam is obtained from the crosslinkable and foamable composition comprising hydrogenated styrenic diblock copolymer, the foam may have the hardness (Asker C) of about, for example, 20 to 80, 20 to 75, 20 to 70, 20 to 65, 20 to 60, 20 to 55, 20 to 50, to 45 or 20 to 40. In some embodiments where the foam is obtained from the crosslinkable and foamable composition comprising hydrogenated styrenic diblock copolymer and the ethylene copolymer, the foam may have the hardness (Asker C) of about 20 to 80, 20 to 75, 20 to 70, to 70, 30 to 70, 30 to 65, 30 to 60 or 30 to 55. However, the present disclosure is not limited thereto, and the hardness (Asker C) of the foam may be adjusted by modifying the components of the crosslinkable and foamable composition.

The crosslinked foam obtained from the crosslinkable and foamable composition may have a compression set of about 30 to 65%, for example, to 65% or 40 to 65%. However, the present disclosure is not limited thereto, and the compression set of the foam may be adjusted by modifying the components of the crosslinkable and foamable composition.

The foam obtained by the crosslinkable and foamable composition of the present disclosure shows an excellent balance of mechanical properties, at least in terms of impact resilience, lightness, permanent compression set, and split tear. Thus, the foam obtained by the crosslinkable and foamable composition of the present disclosure can be widely used in automobiles, constructions, daily necessities, and sport goods as a lightweight and flexible material.

In some embodiments, the foam obtained by the crosslinkable and foamable composition of the present disclosure can be used as a component of footwear, for example, a midsole of the footwear.

In particular, when the specific gravity of foaming is decreased, the mechanical properties tend to be lowered; however, making lightweight crosslinked foam with balance mechanical properties, especially being suitable for shoe midsole or sport foam pad, in the present disclosure can be expected.

Thus, in some embodiments, the foam obtained by crosslinking and foaming the crosslinkable and foamable composition of the present disclosure may be included as a footwear component such as a shoe midsole or a sport foam pad, but the present disclosure is not limited thereto.

Example

The present embodiment will be described in detail below referring to the examples. Nevertheless, the present embodiment is not limited to these examples. In the examples and the comparative examples, the preparation and the identification of the components used in the examples and comparative examples, and the mechanical properties evaluation of the crosslinked foams were carried out by the methods described below.

The polymer structure identification of the hydrogenated styrenic diblock copolymer is determined as follows.
Molecular Weight and Molecular Weight Distribution Weight average molecular weights (Mw) and number average molecular weights (Mn) were both tested and determined by gel permeation chromatography (GPC) instrument. The molecular weight value of the peak in the chromatogram was calculated by a calibration curve of commercially available standard polystyrenes. The molecular weight distribution (Mw/Mn) was determined based on the weight average molecular weights (Mw) and number average molecular weights (Mn). More detail about the testing steps and instrument information are described as below. The apparatus is commercial GPC system including PDI and refractive index detector provided by Waters Corporation. Generally, tetrahydrofuran (THF) is selected as the solvent. Measuring temperature is maintained at 40° C. The flow rate is 1 ml/min, and the injection amount is 100 µl. The ratio of hydrogenated block copolymer/THF is 3 mg/15 cc.
Styrene Content and Vinyl Bond Content The styrene content and the vinyl bond content of the hydrogenated styrenic diblock copolymer prior to hydrogenation are measured by $^1$H-NMR spectrum employing a VARIAN 400 provided by Agilent Technologies, Inc. Generally, deuterated chloroform is selected as the solvent.
Degree of Hydrogenation The degree of hydrogenation may be calculated from the rate of decrease in the unsaturated bond signals in the $^1$H-NMR spectrum, and the calculation is written as follows.

$$\text{Degree of hydrogenation (mol \%)} = B/(A+B) \times 100\%$$

A: Mole number of unhydrogenated conjugated diene monomer unit

B: Mole number of hydrogenated conjugated diene monomer unit
Melt Flow Index

MFI (melt flow index) is measured according to ASTM-D1238.

Novel aspects of styrenic diblock copolymers were assessed as follows.
Compounding Capability An open roller mixer, provided by Hung Ta Instrument Co., Ltd. (HT-8807), is used to evaluate the compounding capability of the styrenic diblock samples of the examples and comparative examples at temperatures not exceeding 120° C. This is to simulate the footwear compounding process, which involve steps for incorporating both free radical initiator and chemical foaming agents and then for injecting the compound into press mold for foaming at temperatures that do not cause premature decomposition. The temperature is from 100 to 120° C. for not causing decomposition of free radical initiators and foaming agents.

Before the compounding process starts, the roller is heated to 120° C. Then, the sample is placed between the two rollers of the roller mixer. The material is grounded into small fragments and melted gradually to form a band. After the material is transformed from solid state to melted state, the melted polymer forms a homogeneous band attached to the rotating roller. At that time, the observation of the level of compounding difficulty and the quality of the band can be seen and determined. If the sample can't be melted well at the temperature condition, the melted surface will be uneven. At the same time, small and irregular size holes can be also observed. On the other hand, if the sample can be melted well at this temperature condition, the melted surface will be smooth and uniform.

A rating of the band formation on the roller surface is rated from 1 to that a rating of 5 indicating a perfect melt film formed, while a rating of 1 indicating a poor chart. Also the photo of the band formation on the roller was taken for direct visual comparison.
Tensile Properties of Resins Tensile properties of both crosslinked samples and un-crosslinked samples were measured according to ASTM D412. The testing specimen of 2 mm thickness in dumbbell shape of the length of 115 mm and the width of 25 mm was prepared by press molding of the sample at 175° C. for 5 minutes. For preparing the crosslinked testing specimen, the sample was first mixed with BIPB peroxide in a Brabender mixer at 110° C. Then the compounded sample was transferred to a mold to be press molded at 175° C. for 10 minutes to complete the crosslinking in the mold. Then the sheet is cut into testing specimen for tensile strength measurement.
MDR Testing According to ASTM D5289, the crosslinking kinetics of the peroxide crosslinked sample is evaluated by using a moving die rheometer (MDR-A1) provided by U-CAN DYNATEX INC. The compounded material is prepared by mixing the sample and BIPB organic peroxide in a Brabender mixer at 100° C. for 15 minutes at 15 rpm. The MDR testing parameters are set at 100 cycles per minute and an arc of 0.5 degrees. For this measurement, the temperature of the MDR testing chamber is set at 175° C. The MDR data are the Minimum torque ($M_L$), a measurement of the viscosity of the molten state before the crosslinking chemical reaction starts to be effective, and the maximum torque ($M_H$), a measurement of the viscosity of the fully crosslinked material. And the difference between maximum and minimum torque ($M_H$–$M_L$) is considered as the degree of crosslinking of the peroxide crosslinked sample.

The mechanical properties of the crosslinked foam were evaluated as follows.

Specific Gravity

The once crosslinked foam was punched out into a circle having a diameter of 2.54 cm and a thickness of 1 cm, and was measured by an electronic hydrometer (MS-204S, manufactured by Mettler Toledo Co., Ltd.).

Hardness

Bases on ASTM D2240, the hardness (Asker C) of the once crosslinked foam was measured using an Asker hardness meter C hardness tester (Type C, manufactured by Polymer Co., Ltd.), and the value was read within 1 second. Also, the average value (arithmetic mean) of five points was taken as the hardness.

Split Tear Strength

The split tear strength of the once crosslinked foam is determined according to ASTM D3574 F.

Tensile Strength

The tensile strength at break of the once crosslinked foam is determined according to ASTM D412.

Elongation

The elongation at break of the once crosslinked foam is determined according to ASTM D412.

Compression Set

The once crosslinked foam was punched out into a circle having a diameter of 2.54 cm, and was used as a test piece and compressed to a thickness of 50%. After holding at 50° C. for 6 hours, the pressure was released, and the thickness after 1 hour was measured. The magnitude of the residual deformation was evaluated.

Impact Resilience

The impact resilience of the crosslinked foam is determined according to ASTM-D2632 in a vertical rebound apparatus. Impact resilience is determined as the ratio of rebound height to drop height of a metal plunger of prescribed mass and shape which is allowed to fall on the foam specimen.

The resin compositions of Examples and Comparative Examples are described as follows.

Styrenic Block Copolymers

SEB-1: Hydrogenated Styrene-Butadiene Diblock Copolymer

First, 4800 g of cyclohexane, 14.1 millimoles of n-butyllithium, and 166 millimoles of tetrahydrofuran (THF) were charged into a reactor of 10 liter size equipped with a heater and a stirrer. Secondly, 160 g styrene was added into the solvent to proceed the anionic polymerization at temperature of about 45° C. Thirdly, 640 g of butadiene was added into the reactor, and the reaction mixture was further polymerized to form a styrene-butadiene diblock copolymer structure, of which the 1,2-vinyl bond content in the butadiene block was about 40 mol %.

The styrenic diblock copolymer obtained by the above-mentioned steps was then hydrogenated in a pressure vessel using a nickel-2-ethylhexanoate/TEAL catalyst and hydrogen gas. The temperature for the hydrogenation process was controlled from about 40° C. to 100° C. After about 80 mol % of the butadiene block was hydrogenated, the hydrogenation reaction was terminated. And then, the obtained sample was washed with hot acidic water to remove residual catalyst. Finally, the block copolymer was isolated by coagulation in hot water and then dried. The yield of the hydrogenated styrenic diblock copolymer was about 80%.

According to analysis, the obtained hydrogenated styrenic diblock copolymer had a styrene content of 20 wt %, degree of hydrogenation of 80 mol %, a weight average molecular weight of about 60,000, a molecular weight distribution (weight average molecular weight/number average molecular weight) of 1.05, and MFI of 3.9 measured at 190° C./5 kgf.

SEB-2: Hydrogenated Styrene-Butadiene Diblock Copolymer

SEB-2, prepared as in the same method of preparing SEB-1, is a hydrogenated styrene-butadiene diblock copolymer with a styrene content of 20 wt %, in which the 1,2-vinyl bond content in the butadiene block is about 39 mol % and degree of hydrogenation of 83.4 mol %. It has a weight average molecular weight of about 75,000 and a molecular weight distribution (weight average molecular weight/number average molecular weight) of 1.03.

SEB-3: Hydrogenated Styrene-Butadiene Diblock Copolymer

SEB-3, prepared as in the same method of preparing SEB-1, is a hydrogenated styrene-butadiene diblock copolymer with a styrene content of 20 wt %, in which the 1,2-vinyl bond content in the butadiene block is about 40 mol % and degree of hydrogenation of 86 mol %. It has a weight average molecular weight of about 112,000, a molecular weight distribution (weight average molecular weight/number average molecular weight) of 1.03 and MFI<0.1 measured at 230° C./5 kg.

SEB-4: Hydrogenated Styrene-Butadiene Diblock Copolymer

SEB-4, prepared as in the same method of preparing SEB-1, is a hydrogenated styrene-butadiene diblock copolymer with a styrene content of 20 wt %, in which the 1,2-vinyl bond content in the butadiene block is about 20 mol % and degree of hydrogenation of 80 mol %. It has a weight average molecular weight of about 60,000, a molecular weight distribution (weight average molecular weight/number average molecular weight) of 1.03 and MFI of 0.39 measured at 190° C./5 kgf.

SEB-5: Hydrogenated Styrene-Butadiene Diblock Copolymer

SEB-5, prepared as in the same method of preparing SEB-1, is a hydrogenated styrene-butadiene diblock copolymer with a styrene content of 24.7 wt %, in which the 1,2-vinyl bond content in the butadiene block is about 42.7 mol % and degree of hydrogenation of 80.8 mol %. It has a weight average molecular weight of about 60,000, a molecular weight distribution (weight average molecular weight/number average molecular weight) of 1.03 and MFI of 4 measured at 190° C./5 kgf.

SEB-6: Hydrogenated Styrene-Butadiene Diblock Copolymer

SEB-6, prepared as in the same method of preparing SEB-1, is a hydrogenated styrene-butadiene diblock copolymer with a styrene content of 29.8 wt %, in which the 1,2-vinyl bond content in the butadiene block is about 39.9 mol % and degree of hydrogenation of 87 mol %. It has a weight average molecular weight of about 59,000, a molecular weight distribution (weight average molecular weight/number average molecular weight) of 1.03.

(S/EB)-EB-1: Hydrogenated (Styrene/Butadiene)-Butadiene Diblock Copolymer (S/EB)-EB-1 is a hydrogenated (styrene/butadiene)-butadiene diblock copolymer containing one block of copolymer of styrene and butadiene, and one block of butadiene. It was prepared as described as follows.

First, 4800 g of cyclohexane, 11.09 millimoles of n-butyllithium, and 166 millimoles of tetrahydrofuran (THF) were charged into a reactor of 10 liter size equipped with a heater and a stirrer. Secondly, both 158 g of styrene and 8 g of butadiene were added (styrene/butadiene weight ratio is 95/5) to the reactor to initiate the anionic copolymerization at a temperature of about 50° C. until the reaction of styrene and butadiene was complete. Thirdly, 667 g of butadiene was added into the reactor, when the polymerization of butadiene was complete, methanol was added, in order to terminate the polymerization to form a (styrene/butadiene)-butadiene diblock copolymer. The 1,2-vinyl bond content in the butadiene block was about 40.8 mol %.

The hydrogenation process was prepared as in the same method of preparing SEB-1. According to the analysis, the obtained hydrogenated (styrene/butadiene)-butadiene diblock copolymer has a styrene content of 19.7 wt %, and the degree of hydrogenation of 80 mol % of butadiene units. It has a weight average molecular weight of about 76,000 and a molecular weight distribution (weight average molecular weight/number average molecular weight) of 1.04 and MFI of 1.1 as measured at 190° C./5 kgf.

(SEB)-EB-2: Hydrogenated (Styrene/Butadiene)-Butadiene Diblock Copolymer (S/EB)-EB-2 is a hydrogenated (styrene/butadiene)-butadiene diblock copolymer containing one block of copolymer of styrene and butadiene, and one block of butadiene. It was prepared as in the same method of preparing (S/EB)-EB-1, except that the styrene/butadiene weight ratio was 90/10 in preparing the block of copolymer of styrene and butadiene. The 1,2-vinyl bond content in the butadiene block was about 43.7 mol %.

The hydrogenated (butadiene/styrene)-butadiene diblock copolymer has a styrene content of 28.5 wt %, and degree of hydrogenation of 78 mol % of butadiene units. It has a weight average molecular weight of about 75,000, and a molecular weight distribution (weight average molecular weight/number average molecular weight) of 1.04 and MFI of 2.7 as measured at 190° C./5 kgf.

SEP-1: Hydrogenated Styrene-Isoprene Diblock Copolymer

SEP-1 is a hydrogenated styrene-isoprene diblock copolymer as described how it was prepared, and characterized in detail. First, 4800 g of cyclohexane, 7.06 millimoles of n-butyllithium, and 2.66 millimoles of tetrahydrofuran (THF) were charged into a reactor of 10 liter size equipped with a heater and a stirrer. Secondly, 534 g of isoprene was added into the reactor to initiate the anionic polymerization at a temperature of about 45° C. Thirdly, 313 g of styrene was added into the reactor, and the reaction mixture was further polymerized to prepare a styrene-isoprene diblock copolymer. The 3,4-vinyl bond content in the isoprene block was about 9.1 mol %.

The styrene-isoprene diblock copolymer obtained by the above-mentioned steps was then hydrogenated in a pressure vessel using a nickel-2-ethylhexanoate/TEAL catalyst and hydrogen gas. The temperature for the hydrogenation process was controlled from about 40° C. to 100° C. After about 80 mol % of the isoprene block was hydrogenated, the hydrogenation reaction was terminated. And then, the obtained sample was washed with hot acidic water to remove residual catalyst. Finally, the block copolymer was isolated by coagulation in hot water and then dried. The yield of the hydrogenated styrenic diblock copolymer was about 80%.

According to analysis, the obtained hydrogenated styrene-isoprene diblock has a styrene content of 37 wt %, degree of hydrogenation of 80 mol %, a weight average molecular weight of about 121,000, a molecular weight distribution (weight average molecular weight/number average molecular weight) of 1.03 and MFI of 4 measured at 230° C./5 kgf.

SEP-2: Hydrogenated Styrene-Isoprene Diblock Copolymer

SEP-2, prepared as in the same method of preparing SEP-1, is a hydrogenated styrene-isoprene diblock copolymer with a styrene content of 25 wt %, in which the 3,4-vinyl bond content in the isoprene block was about 9 mol %, and degree of hydrogenation of 84 mol %. The diblock copolymer has a weight average molecular weight of about 118,000, a molecular weight distribution (weight average molecular weight/number average molecular weight) of 1.03 and MFI of 2.2 measured at 230° C./5 kgf.

EEPS-1: Hydrogenated (Butadiene/Isoprene)-Styrene Diblock Copolymer

EEPS-1 is a hydrogenated (butadiene/isoprene)-styrene diblock copolymer as described how it was prepared, and characterized in detail. First, 4800 g of cyclohexane, 7.89 millimoles of n-butyllithium, and 2.66 millimoles of tetrahydrofuran (THF) were charged into a reactor of 10 liter size equipped with a heater and a stirrer. Secondly, 295 g of isoprene and 197 g of butadiene were added (I/B mole ratio is controlled at 1.25) at the same time to the reactor to initiate the anionic polymerization at a temperature of about 50° C. until the reaction of isoprene and butadiene was complete. Thirdly, 289 g of styrene was added into the reactor, when the polymerization of styrene was complete, methanol was added, in order to terminate the polymerization to form a (isoprene/butadiene)-styrene diblock copolymer. The 3,4-vinyl bond content in the isoprene block was about 13 mol % and the 1,2-vinyl bond content in the butadiene block was about 16 mol %.

The (butadiene/isoprene)-styrene diblock copolymer obtained by the above-mentioned steps was then hydrogenated in a pressure vessel using a nickel-2-ethylhexanoate/TEAL catalyst and hydrogen gas. The temperature for the hydrogenation process was controlled from about 50° C. to 90° C. Once the cumulative amount of absorbed hydrogen reached the amount corresponding to the target degree of hydrogenation, the hydrogenation reaction was terminated. And then, the obtained sample was washed with hot acidic water to remove residual catalyst. Finally, the block copolymer was isolated by coagulation in hot water and then dried. The hydrogenated styrenic diblock copolymer had a degree of hydrogenation of 78.1 mol %, styrene content of 37.1 wt/o, average molecular weight (Mw) of 128,000, a molecular weight distribution (weight average molecular weight/number average molecular weight) of 1.06 and MFI of 0.63 measured at 230° C./5 kgf.

SEBS-1: Partially Hydrogenated Styrene-Butadiene-Styrene Triblock Copolymer

SEBS-1 is a partially hydrogenated styrene-butadiene-styrene triblock copolymer obtained from Asahi Kasei under the Trade name of Tuftec P1083 having styrene content of 20 wt % with a density of 0.89 g/cm³, a melt flow index of 3.0 g/10 minutes as measured at 190° C./2.16 kgf and a hardness (Durometer A) of 56. According to analysis, SEBS-1 has the average weight molecular weight of 61,000, and a molecular weight distribution (weight average molecular weight/number average molecular weight) of 1.04.

SEBS-2: Hydrogenated Styrene-Butadiene-Styrene Triblock Copolymer

SEBS-2 is a hydrogenated styrene-butadiene-styrene triblock copolymer as described how it was prepared, and characterized in detail. First, 4800 g of cyclohexane, 14.5 millimoles of n-butyllithium, and 166 millimoles of tetrahydrofuran (THF) were charged into a reactor of 10 liter size equipped with a heater and a stirrer. Secondly, 100 g styrene was added into the solvent to proceed the anionic polymerization at temperature of about 45° C. Thirdly, 600 g of butadiene was added into the reactor, until the reaction of butadiene was complete. Fourthly, 100 g of styrene was added into the reactor, when the polymerization of styrene was complete, methanol was added, in order to terminate the polymerization to form a styrene-butadiene-styrene triblock copolymer structure. The styrene-butadiene-styrene triblock copolymer had a styrene content of 24 wt % and the 1,2-vinyl bond content in the butadiene block was about 43.4 mol %.

The hydrogenation prepared as in the same method of preparing SEB-1, is a hydrogenated styrene-butadiene-styrene triblock copolymer with degree of hydrogenation of 83.5 mol %. It has a weight average molecular weight of about 57,000, a molecular weight distribution (weight average molecular weight/number average molecular weight) of 1.03 and MFI of 3.6 measured at 190° C./5 kgf.

SEPS-1: Hydrogenated Styrene-Isoprene-Styrene Triblock Copolymer

SEPS-1 is a hydrogenated styrene-isoprene-styrene triblock copolymer as described how it was prepared, and characterized in detail. First, 4800 g of cyclohexane, 10.2 millimoles of n-butyllithium, and 2.66 millimoles of tetrahydrofuran (THF) were charged into a reactor of 10 liter size equipped with a heater and a stirrer. Secondly, 120 g styrene was added into the solvent to proceed the anionic polymerization at temperature of about 45° C. Thirdly, 560 g of isoprene was added into the reactor, until the reaction of isoprene was complete. Fourthly, 120 g of styrene was added into the reactor, when the polymerization of styrene was complete, methanol was added, in order to terminate the polymerization to form a styrene-isoprene-styrene triblock copolymer structure. The styrene-isoprene-styrene triblock copolymer had the 3,4-vinyl bond content in the isoprene block was about 10 mol %.

The hydrogenation prepared as in the same method of preparing SEP-1, is a hydrogenated styrene-isoprene-styrene triblock copolymer with degree of hydrogenation of 78.8 mol %, styrene content of 28.8 wt %, weight average molecular weight of about 95,000, a molecular weight distribution (weight average molecular weight/number average molecular weight) of 1.03 and MFI of 0.23 measured at 230° C./5 kgf.

Ethylene Copolymers

EVA-1: Ethylene-Vinyl Acetate Copolymer

EVA-1 is an ethylene-vinyl acetate copolymer of 25 wt % vinyl acetate content and a melt flow index of 3 g/10 min as measured at 190° C./2.16 kgf, manufactured by USI Corporation, trade name "UE659".

EVA-2: Ethylene-Vinyl Acetate Copolymer

EVA-2 is an ethylene-vinyl acetate copolymer of 18 wt % vinyl acetate content, a melt flow index of 3 g/10 min as measured at 190° C./2.16 kgf manufactured by USI Corporation, trade name "UE629".

POE-1: Ethylene Copolymer

POE-1 is an ethylene/1-octene copolymer, a melt flow index of 3.0 g/10 min as measured at 190° C./2.16 kgf, hardness 0.902 g/cm³, manufactured by Dow Chemical Company, trade name "Engage 8450".

POE-2: Ethylene Copolymer

POE-2 is an ethylene/1-butene copolymer, a melt flow index of 1.2 g/10 min as measured at 190° C./2.16 kgf, hardness 0.885 g/cm³, manufactured by Mitsui Chemicals, Inc., trade name "Tafmer DF810".

Organic Peroxide

Bis(1-(tert-butylperoxy)-1-methylethyl)-benzene (BIPB) (manufactured by Arkema Group) was used.

Chemical Foaming Agent

Azodicarbonamide (AC) (manufactured by Kumyang Corporation) was used.

Other Additives

Calcium carbonate (manufactured by Yuncheng Chemical Industrial CO., LTD.), ZnO (Zinc Oxide, manufactured by Diamonchem International Co., Ltd.), and Stearic Acid manufactured by Vulchem Inc. were used.

Results

The following Table 1 lists the polymer structure information of representative styrenic diblock copolymers and styrenic triblock copolymers, the melt flow index, and the rating of the compounding capability as measured according to the description in the above section. FIG. 1 shows the photos of the band formation of the samples on the rotating roller taken during the evaluation of compounding capability.

TABLE 1

|  | SEB-5 | SEBS-2 | (S/EB)-EB-2 | SEP-1 | SEPS-1 | EEPS-1 |
|---|---|---|---|---|---|---|
| Styrene content (wt %) | 24.7 | 24 | 28.5 | 37 | 28.8 | 37.1 |
| 1, 2-vinyl bond content of butadiene (mol %) | 42.7 | 43.4 | 43 7 | — | — | 16 |
| 3, 4-vinyl bond content of isoprene (mol %) | — | — | — | 9.1 | 10 | 13 |
| Hydrogenation degree (mol %) | 80.8 | 83.5 | 78 | 80 | 78.8 | 78.1 |
| Weight average molecular weight | 60K | 57K | 75K | 121k | 95K | 128K |
| MFI (190 ° C./5 kg) | 4 | 3.6 | 2.7 | — | — | — |
| MFI (230 ° C./5 kg) | — | — | — | 4 | 0.23 | 0.63 |
| Compounding rating (at 120 ° C.) | 5 | 3 | 5 | 5 | 1 | 5 |

According to the result shown in Table 1 and FIG. 1, it is clear to see that the diblock samples (SEB-5, SEP-1, (S/EB)-EB-2 and EEPS-1) are all compounded well to form transparent bands on the rotating roller. SEBS-2 with comparable polymer structure and average weight molecular weight with SEB-5 except being a triblock copolymer was much difficult to compound in the roll mill, forming an opaque band on the rotating roller. Much unexpectedly, both SEP-1 and EEPS-1 of much higher Mw and high melt viscosity as indicated from the MFI values can be compounded well. For example, SEP-1 has a Mw of 121,000. For comparison, SEPS-1 with a Mw of 95,000 was much difficult to compound in the roll mill, forming an opaque band on the rotating roller. (S/EB)-EB-2, where the hard block is a copolymer of styrene and butadiene in weight ratio of 9/1, performed best in the roller compounding evaluation, forming a very smooth and transparent band on the roll mill.

The following Table 2a and Table 2b list the mechanical properties of SEB-5 and SEBS-2 before and after peroxide curing with 0.5 phr BIPB.

TABLE 2a

|  | Hardness (Shore A) | Tensile (kgf/cm$^2$) @10% elongation | Tensile (kgf/cm$^2$) @20% elongation | Tensile (kgf/cm$^2$) @40% elongation |
|---|---|---|---|---|
| SEB-5 | 44 | 2.4 | 3 | — |
| SEB-5 + 0.5 phr BIPB | 58 | 5.5 | 8.4 | 12.3 |
| SEBS-2 | 69 | 13.8 | 16.8 | 19.7 |
| SEBS-2 + 0.5 phr BIPB | 67 | 6.8 | 10.5 | 14.7 |

According to the result shown in Table 2a, being a diblock copolymer, SEB-5 is very poor in mechanical strength. It broke with an elongation of less than 40%. After crosslinking, SEB-5 is transformed into a TPE like stronger resin. For example, the hardness increases from 44 Shore A to 58 Shore A. Unexpectedly, the peroxide crosslinked SEBS-2 shows an opposite result. The mechanical strength of the peroxide crosslinked SEBS-2 failed to see an enhancement. In fact, both the hardness and the tensile properties decreased slightly after crosslinking. In this table, phr is the unit abbreviation of parts per hundreds of rubber or resin.

TABLE 2b

|  | BIPB (phr) | ML (dNm) | MH (dNm) | MH-ML (dNm) |
|---|---|---|---|---|
| SEBS-2 | 0.5 | 0.4 | 3.1 | 2.7 |
| SEB-5 | 0.5 | 0.4 | 4.7 | 4.3 |

As shown in Table 2b, the diblock SEB-5 attains a higher value of MH-ML than that of the triblock SEBS-2 crosslinked with 0.5 phr of BIPB. It suggests that SEB-5 reaches a higher degree of crosslinking than SEBS-2 of comparable polymer structure. Judging from the effect of peroxide crosslinking on mechanical properties and crosslinking kinetics, diblock structure of SEB-5 is preferred in peroxide crosslinking.

In the following examples (abbreviated as Ex) and comparative examples (abbreviated as Comp Ex), the styrenic block copolymers were mixed with the organic peroxide and foaming agent to prepare the crosslinked foam.

In Example 1, SEB-1 hydrogenated styrene-butadiene diblock copolymer, 0.5 part per hundred (phr) Bis(1-(tert-butylperoxy)-1-methylethyl)-benzene (BIPB) as the organic peroxide, 3.0 phr azodicarbonamide (AC) as the foaming agent, 10 phr calcium carbonate, 1 phr zinc oxide, and 1 phr steric acid were mixed and kneaded for 10 minutes in a roll mill having a roll surface temperature of 120° C., and the mixture was then molded into a sheet shape. The addition amounts of the BIPB, AC, calcium carbonate, zinc oxide and steric acid were based upon the total weight of the resin components (herein, SEB-1).

After being filled in a press mold, the obtained sheet was pressurized and heated under conditions of 175° C. and about 10 minutes at a pressure of 100 kgf/cm$^2$ to obtain the crosslinked foam. The size of the press mold was 10 mm in thickness, 150 mm in length and 150 mm in width. Subsequently, the foam properties were determined according to the above-described methods. The results are shown in the following Table 3.

Example 2 to Example 5 were prepared and tested according to the same method as Example 1 with the exception that different styrenic diblock copolymers, and varied peroxide contents and foaming agent contents are used as listed in Table 3. Comparative Example 1 were prepared and tested according to the same method as Example 1 except that a partially hydrogenated SEBS-1 was used. The results are shown in following Table 3.

TABLE 3

| Formulation |  | Ex 1 | Ex 2 | Ex 3 | Ex 4 | Ex 5 | Comp Ex 1 |
|---|---|---|---|---|---|---|---|
| SBC resin (100 parts) |  | SEB-1 | SEB-2 | SEB-4 | SEB-5 | SEB-6 | SEBS-1 |
| BIPB (phr) |  | 0.5 | 0.3 | 0.2 | 0.35 | 0.52 | 0.5 |
| AC (phr) |  | 3 | 3 | 3.2 | 3 | 3 | 2.7 |
| Physical Properties | Unit |  |  |  |  |  |  |
| Density | g/cm$^3$ | 0.195 | 0.232 | 0.215 | 0.184 | 0.19 | 0.2 |
| Hardness | Asker C | 23 | 31 | 38 | 25 | 32 | 27 |
| Tensile Strength | kgf/cm$^2$ | 20.5 | 31.5 | 33 | 22.2 | 33.6 | 20 |
| Elongation | % | 274 | 353 | 296 | 297 | 299 | 244 |
| Split Tear | kgf/cm | 1.13 | 1.56 | 1.19 | 1.23 | 1.54 | 0.6 |
| Compression Set | % | 54 | 43 | 51 | 58 | 53 | 70 |
| Impact. Resilience | % | 65 | 67 | 65 | 61 | 57 | 71 |
| Shrinkage | % | 2 | 2 | 3 | 2 | 2 | 5 |

According to the results shown in Table 3, the crosslinked foams of Example 1 to Example 5 demonstrate that the hydrogenated styrene-butadiene diblock copolymers of different molecular weight, 1,2-vinyl content, degree of hydrogenation, and styrene content in the SEB diblock copolymer can be compounded well and foamed into light weight foam with excellent impact resilience. For example, in Example 2, SEB-2 with a Mw of 75,000 was compounded well for making into light weight foam. SEBS-1 in Comparative Example 1 has comparable polymer structure of SEB-1 in Mw, 1, 2-vinyl content, degree of hydrogenation, and polystyrene content in the polymer. Comparative Example 1 shows slightly better impact resilience, but poor in tear resistance and compression set than Example 1.

In the following examples, the styrenic block copolymers and the ethylene copolymer were mixed with the organic peroxide and foaming agent to prepare the crosslinked foam. In the examples and comparative examples listed in the following Table 4 to Table 7, the crosslinked foams were prepared and tested according to the same method as Example 1 except with different polymer formulations.

TABLE 4

| Polymer and formulation | Ex 6 | Comp Ex 2 | Comp Ex 3 | Ex 7 | Comp Ex 4 | Comp Ex 5 |
|---|---|---|---|---|---|---|
| SBC resin | SEB-1 20 parts | | SEBS-1 20 parts | SEB-1 40 parts | | SEBS-1 40 parts |
| EVA | EVA-1 80 parts | EVA-1 100 parts | EVA-1 80 parts | EVA-2 60 parts | EVA-2 100 parts | EVA-2 60 parts |

TABLE 4-continued

| Polymer and formulation | Ex 6 | Comp Ex 2 | Comp Ex 3 | Ex 7 | Comp Ex 4 | Comp Ex 5 |
|---|---|---|---|---|---|---|
| Physical Properties (unit) | | | | | | |
| Density (g/cm$^3$) | 0.22 | 0.20 | 0.21 | 0.21 | 0.20 | 0.22 |
| Hardness (Asker C) | 47 | 50 | 48 | 47 | 57 | 49 |
| Tensile Strength (kgf/cm$^2$) | 30.2 | 30.2 | 31.1 | 24.7 | 27.6 | 28.9 |
| Elongation (%) | 234 | 210 | 232 | 207 | 200 | 235 |
| Split Tear (kgf/cm) | 2.47 | 2.62 | 2.43 | 1.77 | 3.1 | 1.7 |
| Compression Set (%) | 63 | 60 | 59 | 61 | 66 | 63 |
| Impact Rest hence (%) | 55 | 53 | 55 | 50 | 44 | 51 |

According to Table 4, Comparative Example 2 and Comparative Example 4 are based on EVA-1 and EVA-2 respectively. Example 6 and Example 7 are based on the blends of SEB-1 diblock copolymer with EVA-1 and EVA-2 respectively. Comparative Example 3 and Comparative Example 5 are based on the blends of SEBS-1 triblock copolymer with EVA-1 and EVA-2 respectively.

The results of Table 4 indicate that the EVA blends foams of Example 6, Comparative Example 3, Example 7 and Comparative Example 5 all show improved impact resilience than Comparative Example 2 and Comparative Example 4, respectively. The foam samples of Example 6 and Example 7 show comparable foam properties of that of Comparative Example 3 and Comparative Example 5.

TABLE 5

| Polymer and formulation | Comp Ex 6 | Comp Ex 7 | Ex 8 | Ex 9 | Ex 10 | Ex 11 | Ex 12 | Ex 13 | Ex 14 | Ex 15 |
|---|---|---|---|---|---|---|---|---|---|---|
| SBC resin | SEBS-1 30 parts | SEBS-2 30 parts | SEB-1 30 parts | SEB-2 30 parts | SEB-3 30 parts | SEB-4 30 parts | SEB-5 30 parts | SEB-6 30 parts | (S/EB)-EB-1 30 parts | (S/E B)-EB-2 30 parts |
| EVA | EVA-1 70 parts | EVA-1 70 parts | EVA-1 70 parts | EVA-1 70 parts | EVA-1 70 parts | EVA-1 70 parts | EVA-1 70 parts | EVA-1 70 parts | EVA-1 70 parts | EVA-1 70 parts |
| BIPB (phr) | 0.5 | 0.5 | 0.5 | 0.5 | 0.5 | 0.4 | 0.5 | 0.5 | 0.5 | 0.5 |
| AC (phr) | 2.6 | 3 | 2.5 | 3 | 3 | 3.2 | 3 | 2.2 | 3 | 2.6 |
| Physical Properties (unit) | | | | | | | | | | |
| Density (g/cm$^3$) | 0.205 | 0.144 | 0.212 | 0.22 | 0.22 | 0.19 | 0.16 | 0.215 | 0.208 | 0.22 |
| Hardness (Asker C) | 46 | 34 | 45 | 49 | 51 | 47 | 38 | 48 | 47 | 51 |
| Tensile Strength (kgf/cm$^2$) | 28.2 | 19.8 | 26 | 27 | 30 | 27.8 | 23 | 35.1 | 27.9 | 30.4 |
| Elongation (%) | 232 | 225 | 224 | 208 | 207 | 194 | 221 | 269 | 200 | 205 |
| Split Tear (kgf/cm) | 1.85 | 1.43 | 1.92 | 1.62 | 1.65 | 1.06 | 1.33 | 2.52 | 1.37 | 1.56 |
| Compression Set (%) | 57 | 70 | 61 | 52 | 48 | 55 | 61 | 58 | 51 | 52 |
| Impact Resilience (%) | 59 | 55 | 57 | 60 | 58 | 57 | 55 | 53 | 56 | 53 |
| Shrinkage (%) | 3 | 4 | 4 | 2 | 4 | 4 | 4 | 4 | 4 | 5 |

Table 5 further shows the foam mechanical properties of Example 8 to Example 13 based on EVA-1 blends with varied SEB diblock, of Example 14 and Example 15 based on EVA-1 blends with varied (S/EB)-EB diblock, where the hard block is a copolymer of styrene and butadiene, and of Comparative Example 6 and Comparative Example 7 based on EVA-1 blends with varied SEBS triblock copolymers. SEBS-1 in Comparative Example 6 and SEBS-2 in Comparative Example 7 have comparable polymer structures with SEB-1 in Example 8, and SEB-5 in Example 12 respectively.

The results in Table 5 further demonstrates that the foam samples of Example 8 to Example 15 based on styrenic diblock copolymers of varied polymer structure and molecular weight all show desirable impact resistance. In comparison, Example 8 and Comparative Example 6, and Example 12 and Comparative Example 7 show comparable foam properties, respectively.

TABLE 6

| Polymer and formulation | Ex 16 | Ex 17 | Ex 18 | Ex 19 |
|---|---|---|---|---|
| SBC resin | SEB-1 30 parts | SEB-1 30 parts | SEB-1 30 parts | SEB-1 30 parts |
| POE | POE-2 70 parts | POE-2 10 parts | POE-1 70 parts | POE-1 10 parts |
| EVA | — | EVA-1 60 parts | — | EVA-1 60 parts |
| Physical Properties (unit) | | | | |
| Density (g/cm³) | 0.2 | 0.208 | 0.2 | 0.208 |
| Hardness (Asker C) | 42 | 45 | 42 | 45 |
| Tensile Strength (kgf/cm²) | 30.5 | 25.7 | 30.5 | 25.7 |
| Elongation (%) | 298 | 240 | 298 | 240 |
| Split Tear (kgf/cm) | 2.43 | 1.94 | 2.43 | 1.94 |
| Compression Set (%) | 64 | 60 | 64 | 60 |
| Impact Resilience (%) | 63 | 59 | 63 | 59 |
| Shrinkage (%) | 4 | 4 | 4 | 4 |

Table 6 further shows the foam mechanical properties of Example 16 to Example 19 based on blends of SEB-1 diblock with ethylene/1-butene copolymer (POE-2), a mixture of EVA-1 and POE-2, ethylene/1-octene copolymer (POE-1), and a mixture of EVA-1 and POE-1, respectively. The foam properties shown in Table 6 demonstrate that the SEB-1 diblock copolymer have excellent compatibility with ethylene copolymer of EVA and ethylene/α-olefin copolymer.

TABLE 7

| Polymer and formulation | Ex 20 | Ex 21 | Ex 22 | Exe 23 | Ex 24 | Ex 25 |
|---|---|---|---|---|---|---|
| SBC resin | SEP-1 100 parts | SEP-1 30 parts | SEP-2 100 parts | SEP-2 30 parts | EEPS-1 100 parts | EEPS-1 30 parts |
| EVA | — | EVA-1 70 parts | — | EVA-1 70 parts | — | EVA-1 70 parts |
| BIPB (phr) | 0.4 | 0.5 | 0.4 | 0.5 | 0.3 | 0.5 |
| AC (phr) | 3 | 2.5 | 3 | 3 | 3.5 | 3 |
| Physical Properties (unit) | | | | | | |
| Density (g/cm³) | 0.201 | 0.184 | 0.222 | 0.228 | 0.202 | 0.18 |
| Hardness (Asker C) | 47 | 45 | 30 | 50 | 50 | 46 |

TABLE 7-continued

| Polymer and formulation | Ex 20 | Ex 21 | Ex 22 | Exe 23 | Ex 24 | Ex 25 |
|---|---|---|---|---|---|---|
| Tensile Strength (kgf/cm²) | 34.6 | 36 | 31.4 | 40.7 | 35.2 | 25.3 |
| Elongation (%) | 260 | 287 | 393 | 320 | 277 | 206 |
| Split Tear (kgf/cm) | 1.69 | 2.68 | 1.48 | 2.57 | 1.77 | 1.37 |
| Compression Set (%) | 40 | 62 | 49 | 54 | 49 | 49 |
| Impact Resilience (%) | 51 | 50 | 65 | 57 | 52 | 55 |
| Shrinkage (%) | 1 | 3 | 1 | 2.5 | 2 | 3 |

The crosslinked foams of Example 20 to Example 25 were prepared and tested according to the same method as Example 1 except with different polymer formulations. Example 20 and Example 21 were based on SEP-1, a partially hydrogenated styrene-isoprene diblock copolymer, and on SEP-1 blend with EVA-1, respectively. Example 22 and Example 23 were based on SEP-2, a partially hydrogenated styrene-isoprene diblock copolymer with a lower styrene content, and on SEP-2 blend with EVA-1, respectively. Example 24 and Example 25 were based on EEPS-1, a partially hydrogenated (butadiene/isoprene)-styrene diblock copolymer, and on EEPS-1 blend with EVA-1, respectively. The foam properties are shown in Table 7. Unexpectedly, despite the high Mw and high melt viscosity, the composition comprising SEP-1, SEP-2 or EEPS-1 diblock copolymer were all compounded well and foamed into light weight foams.

In conclusion, the crosslinked foam obtained by the crosslinkable and foamable composition comprising the hydrogenated styrenic diblock copolymer of the present disclosure shows the excellent and balance mechanical properties such as long-term durability tear strength, impact resilience, mold stability, and workability. Thus, the crosslinked foam obtained by the crosslinkable and foamable composition comprising the hydrogenated styrenic diblock copolymer of the present disclosure can be suitably used as various molded articles such as shoe midsole and outsole, automotive parts, civil engineering and construction applications, household appliance parts, sporting goods, as well as in a wide range of other fields.

Although the present disclosure has been explained in relation to its embodiment, it is to be understood that many other possible modifications and variations can be made without departing from the spirit and scope of the disclosure as hereinafter claimed.

What is claimed is:

1. A crosslinkable and foamable composition, comprising a hydrogenated styrenic diblock copolymer, a free radical initiator, and a foaming agent, wherein the hydrogenated styrenic diblock copolymer comprises:

a first block comprising a conjugated diene monomer unit; and a second block comprising a styrene unit, wherein the hydrogenated styrenic diblock copolymer comprises 10 to 60 wt % of the styrene unit, 50 mol % or more of the conjugated diene monomer unit is hydrogenated, and the hydrogenated styrenic diblock copolymer has a weight average molecular weight of 30000 to 200000.

2. The crosslinkable and foamable composition of claim 1, wherein the first block is a polymer block of a butadiene unit, an isoprene unit, or a mixture thereof, and the second block is a polymer block of the styrene unit.

3. The crosslinkable and foamable composition of claim 1, wherein the first block is a polymer block of a butadiene unit, an isoprene unit, or a mixture thereof, and the second block is a polymer block of the styrene unit and a conjugated diene monomer unit, wherein the conjugated diene monomer unit is a butadiene unit, an isoprene unit, or a mixture thereof, and a content of the conjugated diene monomer unit in the second block is less than or equal to 15 wt % based on a total weight of the second block.

4. The crosslinkable and foamable composition of claim 1, wherein the first block is a polymer block of a butadiene unit, and the second block is a polymer block of the styrene unit.

5. The crosslinkable and foamable composition of claim 1, wherein the first block is a polymer block of a butadiene unit, and the second block is a polymer block of the styrene unit and a butadiene unit, wherein a content of the butadiene unit in the second block is less than or equal to 15 wt % based on a total weight of the second block.

6. The crosslinkable and foamable composition of claim 2, wherein a 1,2-vinyl bond content in the butadiene unit is in a range of 5 to 60 mol % prior to hydrogenation.

7. The crosslinkable and foamable composition of claim 3, wherein a 1,2-vinyl bond content in the butadiene unit is in a range of 5 to 60 mol % prior to hydrogenation.

8. The crosslinkable and foamable composition of claim 4, wherein a 1,2-vinyl bond content in the butadiene unit is in a range of 5 to 60 mol % prior to hydrogenation.

9. The crosslinkable and foamable composition of claim 5, wherein a 1,2-vinyl bond content in the butadiene unit is in a range of 5 to 60 mol % prior to hydrogenation.

10. The crosslinkable and foamable composition of claim 2, wherein a 3,4-vinyl bond content in the isoprene unit is in the range of 5 to 60 mol % prior to hydrogenation.

11. The crosslinkable and foamable composition of claim 3, wherein a 3,4-vinyl bond content in the isoprene unit is in the range of 5 to 60 mol % prior to hydrogenation.

12. The crosslinkable and foamable composition of claim 1, wherein 60 to 95 mol % of the conjugated diene monomer unit is hydrogenated after hydrogenation.

13. The crosslinkable and foamable composition of claim 1, wherein the free radical initiator is an organic peroxide, wherein the organic peroxide is selected from the group consisting of dicumyl peroxide, bis(1-(tert-butylperoxy)-1-methylethyl)-benzene, and a combination thereof.

14. The crosslinkable and foamable composition of claim 1, wherein the foaming agent is a chemical foaming agent, wherein the chemical foaming agent is azodicarbonamide.

15. The crosslinkable and foamable composition of claim 1, further comprising a crosslinking co-agent.

16. A crosslinkable and foamable composition of claim 1, further comprising an ethylene copolymer, wherein a weight ratio of the ethylene copolymer to the hydrogenated styrenic diblock copolymer is from 50/50 to 95/5.

17. The crosslinkable and foamable composition of claim 16, wherein the ethylene copolymer comprises an ethylene-vinyl acetate copolymer, an ethylene-α-olefin copolymer, or a combination thereof.

18. The crosslinkable and foamable composition of claim 16, wherein the ethylene copolymer is an ethylene-vinyl acetate copolymer, and a content of vinyl acetate is in a range of 15 to 40 wt % based on a total weight of the ethylene copolymer.

19. The crosslinkable and foamable composition of claim 16, further comprising a crosslinking co-agent.

20. A foam obtained by crosslinking and foaming a crosslinkable and foamable composition of claim 1.

21. The foam of claim 20, wherein the foam has a specific gravity of 0.05 to 0.5 g/cm3, a compression set of 30 to 65%, a hardness of 20 to 80, and an impact resilience of 40 to 80%.

22. The foam of claim 20, wherein the foam has a specific gravity of 0.05 to 0.5 g/cm3, a compression set of 30 to 65%, a hardness of 20 to 80, and an impact resilience of 55 to 80%.

23. The foam of claim 20, which is a component of footwear.

24. The foam of claim 23, which is a midsole of the footwear.

25. A foam obtained by crosslinking and foaming a crosslinkable and foamable composition of claim 16.

26. The foam of claim 25, wherein the foam has a specific gravity of 0.05 to 0.4 g/cm$^3$, a compression set of 30 to 65%, a hardness of 30 to 70, and an impact resilience of 40 to 80%.

27. The foam of claim 25, wherein the foam has a specific gravity of 0.05 to 0.4 g/cm$^3$, a compression set of 30 to 65%, a hardness of 30 to 70, and an impact resilience of 50 to 80%.

28. The foam of claim 25, which is a component of footwear.

29. The foam of claim 28, which is a midsole of the footwear.

30. The foam of claim 20, wherein a method of crosslinking and foaming comprises the following steps:

preparing by mixing the crosslinkable and foamable composition of claim 1 at a temperature at or below 120° C.; and foaming at a mold temperature of about 150 to 200° C.

31. The foam of claim 25, wherein a method of crosslinking and foaming comprises the following steps:

preparing by mixing the crosslinkable and foamable composition of claim 16 at a temperature at or below 120° C.; and foaming at a mold temperature of about 150 to 200° C.

* * * * *